United States Patent [19]

Zimmerman

[11] 4,130,103

[45] Dec. 19, 1978

[54] CHARCOAL LIGHTER BASKET

[76] Inventor: Leonard P. Zimmerman, 1443 Spring Hill Ter., Augusta, Ga. 30904

[21] Appl. No.: 776,491

[22] Filed: Mar. 11, 1977

[51] Int. Cl.² ............................................. F23B 3/00
[52] U.S. Cl. ................................... 126/25 B; 220/19; 220/401; 220/408
[58] Field of Search ....................... 126/25 B; 110/1 F; 220/19

[56] References Cited

U.S. PATENT DOCUMENTS

| 1,037,539 | 9/1912 | Rodgers | 220/19 |
| 1,879,466 | 9/1932 | Pierce | 220/19 |
| 2,807,457 | 9/1957 | Beadle | 220/19 X |
| 3,453,975 | 7/1969 | Gunter | 110/1 F |
| 3,529,557 | 9/1970 | Treanor | 126/25 B X |

FOREIGN PATENT DOCUMENTS 413920  5/1925  Fed. Rep. of Germany ............. 220/19

Primary Examiner—Martin P. Schwadron
Assistant Examiner—Richard Gerard
Attorney, Agent, or Firm—Newton, Hopkins & Ormsby

[57] ABSTRACT

To reduce the time and inconvenience usually involved in the process of igniting charcoal briquettes, an upstanding stiff wire basket having a heat shielded lifting handle is utilized in conjunction with a comparatively fine mesh basket liner which retains finer charcoal particles. Following ignition of the briquettes, they can be delivered from the basket to any barbecue grill or other use point. The necessity for piling the briquettes by hand is eliminated.

6 Claims, 6 Drawing Figures

CHARCOAL LIGHTER BASKET

BACKGROUND OF THE INVENTION

The prior art contains many proposals to aid in igniting charcoal briquettes to render their use as a cooking fuel more convenient. Such prior art devices range from mere briquette supporting trays or grids to containers having built-in igniting means including electrically operated igniters. Some examples of the patented prior art devices are shown in the following U.S. Pat. Nos.:

3,216,379 — Durfee
3,529,557 — Treanor
3,590,755 — Niemann
3,739,732 — Graham

While these prior art arrangements are useful and reduce labor and inconvenience, they tend to be expensive, particularly where involving electrical heating elements, liquid fuel chambers and other like comparatively complex provisions.

In spite of prior art developments, there is an unfilled need for a simpler and more economical means to assist in igniting charcoal briquettes commonly used in outdoor cooking, without the necessity for piling or arranging the briquettes by hand and without electrical or other expensive igniting arrangements. The objective of this invention is simply to fulfill the need of the art by means of a highly economical, simple and convenient device which enables the user to place briquettes in the device, apply lighter fluid to them, and ignite them with a match and after the briquettes are fully ignited and burning to the required degree, deliver them by using the device to a barbecue grill for cooking purposes, all without touching the briquettes with the hands.

SUMMARY OF THE INVENTION

A device for igniting and handling fuel briquettes embodies a stiff wire outer basket open at the top and equipped with a side carrying handle. A fine wire mesh basket liner is received within the outer basket telescopically and a heat resistant shield is sandwiched between the side walls of the outer basket and liner with the carrying handle secured to the outer basket.

According to a variant of the invention, the fine mesh liner has a side wall and a bottom wall of double thickness with the heat resistant shield or panel sandwiched between the side walls of the mesh liner. Wire end extensions of the outer stiff wire basket are utilized to anchor the fine mesh liner. The carrying handle is connected by screws or like fasteners to a rigid backing plate with a portion of the basket side wall sandwiched therebetween adjacent to the heat resistant shield or panel.

DETAILED DESCRIPTION

Figure 1:
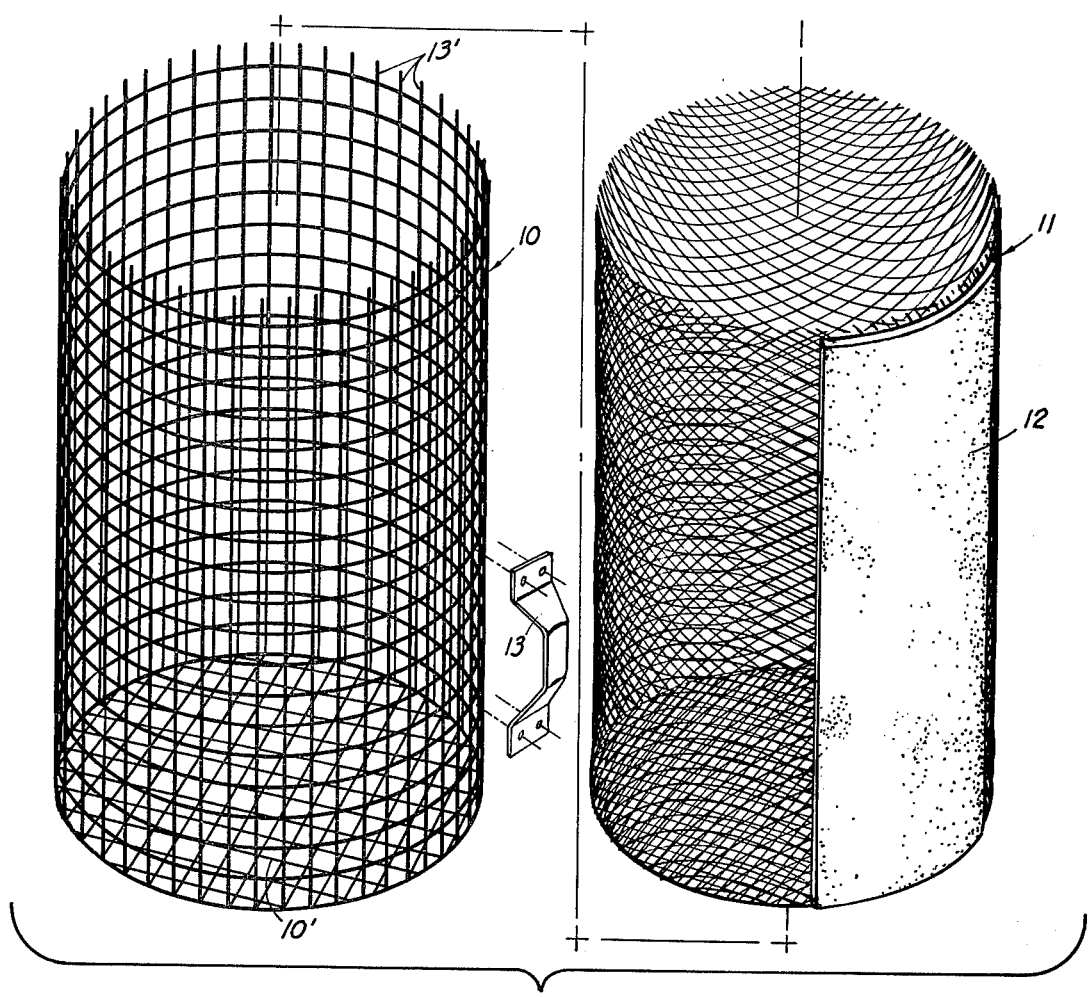
FIG. 1 is an exploded perspective view of the invention according to one embodiment thereof.
Figure 2:
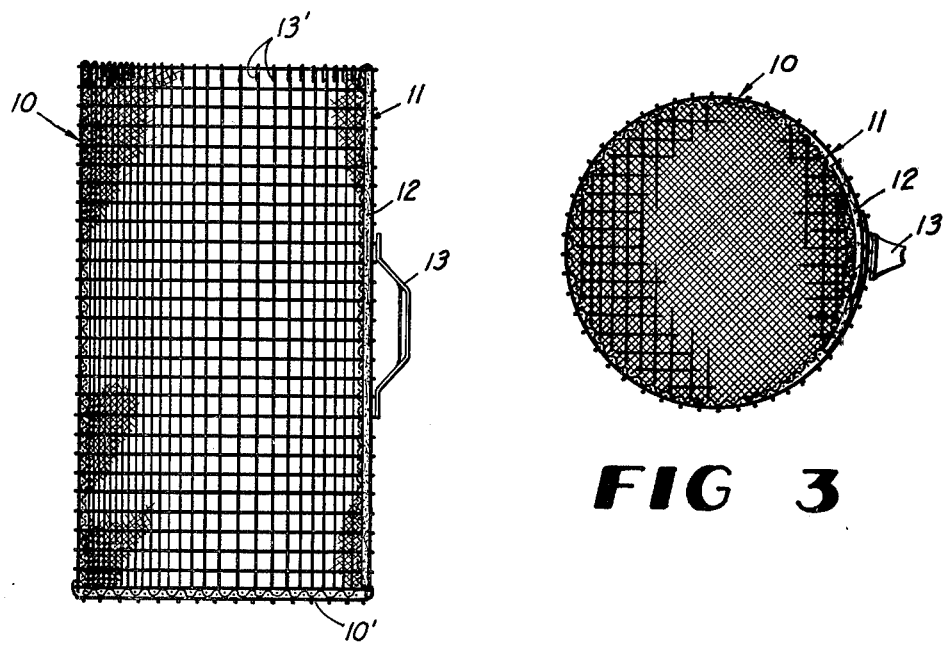
FIG. 2 is a side elevation of the invention assembled.
Figure 3:
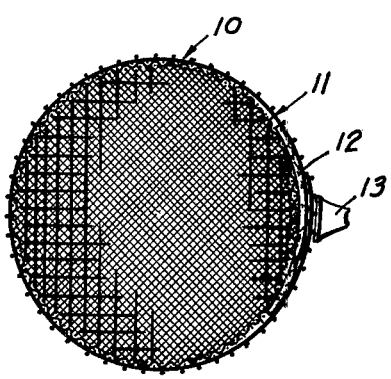
FIG. 3 is a plan view of the invention as shown in FIG. 2.

Referring to the drawings in detail wherein like numerals designate like parts, and considering first FIGS. 1 to 3, the numeral 10 designates an outer preferably cylindrical container body or basket formed of comparatively stiff wire mesh, which mesh may have openings of approximately one-half inch square, more or less. The stiff wire basket 10 is upstanding in use, has an integral flat bottom wall 10' and is open at its top. The basket 10 forms the primary support means for fuel briquettes during the use of the device.

The invention further comprises a cylindrical open top basket liner 11 including an integral bottom wall which fits telescopically in the outer stiff basket 10 snugly. The liner 11 is formed of stainless steel wire mesh or other wire alloy of comparative fineness. That is to say, the openings of the fine wire mesh liner 11 are small and are preferably in the range of one-eighth inch or less across, whereby the liner 11 will retain smaller briquette particles which flake off from the main bodies of the solid fuel briquettes, such as charcoal briquettes.

The fine mesh sleeve 11, while self-supporting, is greatly reinforced in its briquette holding power by the outer stiff wire basket 10, the open mesh construction of both components 10 and 11 allowing free circulation of air around and through the fuel to promote ignition.

A heat resistant arcuate panel or shield 12 extends substantially from top to bottom of the components 10 and 11 and spans a restricted arcuate side wall portion of the device adjacent to a side carrying handle 13. The shield 12 in the assembled device, FIGS. 2 and 3, is sandwiched snugly between the side walls of the outer basket 10 and interior liner 11. The side carrying handle 13 is attached to the outer basket side wall preferably by brazing but could be attached by separable fasteners such as bolts which could penetrate the shield 12 and inner liner.

Top wire extensions 13' of the outer basket 10 may be bent over at the top of the structure, FIG. 2, to anchor the top edge of the fine wire mesh liner 11 in the assembled device.

In the use of the device, briquettes are merely poured from a bag into the basket structure and are then soaked with lighter fluid and fired with a match or other convenient means. Ignition will be instant and when the briquettes are burned to a sufficient extent to be used as cooking fuel, they are transported by the device to a charcoal grill or other convenient use point and deposited by the device in a desirable cooking array, all without the necessity for the user to ever touch the briquettes, and without the requirement for electrical igniting means, expensive built-in fuel tanks, or other expensive features. The invention is lightweight, inexpensive, durable, and very convenient to use. It fulfills a need of the art which heretofore has not been satisfied.

Figure 4:
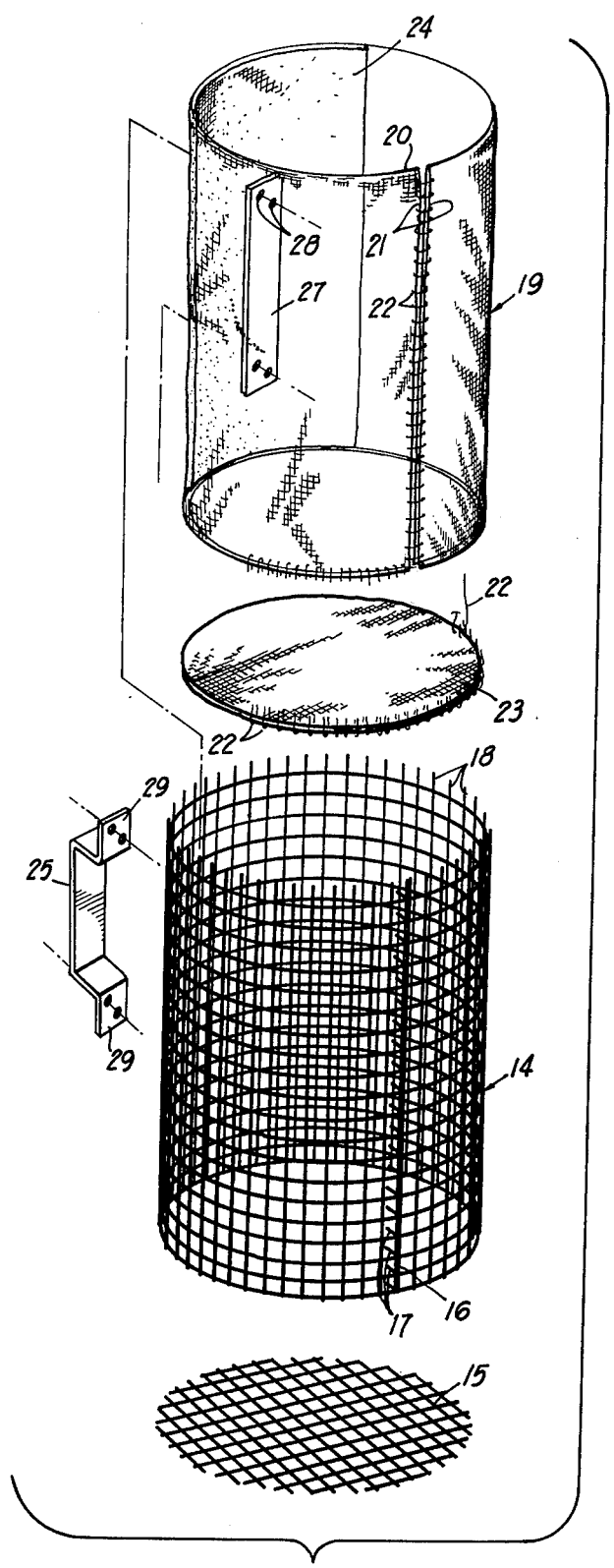
FIG. 4 is an exploded perspective view showing a second embodiment of the invention.
Figure 5:
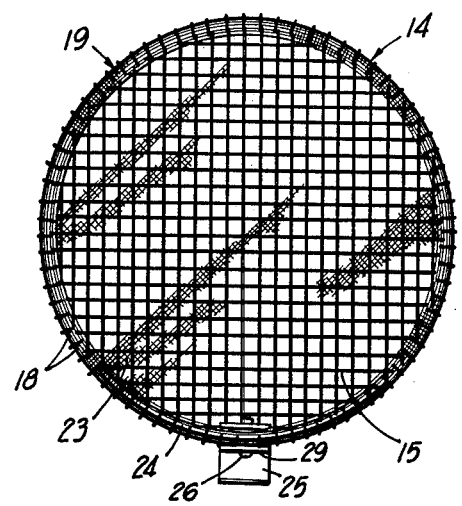
FIG. 5 is a plan view of the second embodiment, fully assembled.
Figure 6:
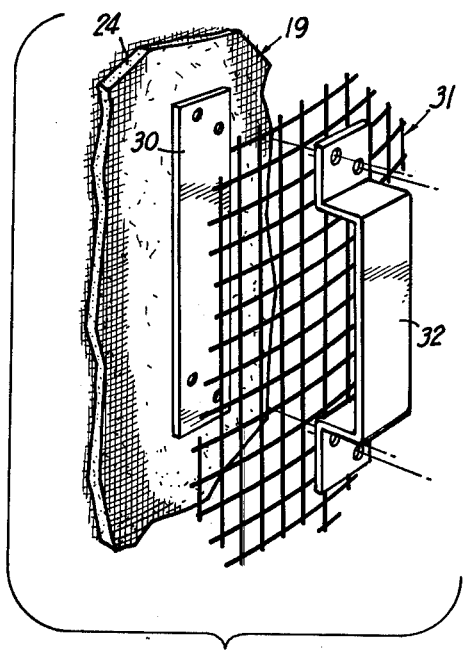
FIG. 6 is a fragmentary exploded perspective view showing a variant in the handle mounting on the second embodiment.

FIGS. 4 to 6 of the drawings show another embodiment of the invention in which the exterior stiff wire larger mesh basket is formed as an open-ended cylinder 14 having a separately formed bottom wall 15. Following formation of the cylinder 14 from a single section of stiff wire mesh, the ends thereof are overlapped slightly and brazed to produce a longitudinal seam 16. The circumferential wire ends 17 at this seam are directed radially inwardly, FIG. 4, for a purpose to be described.

Similarly, the longitudinal wire ends 18 at the top of the cylinder 14 remain uncut for a purpose to be described. The mesh bottom 15 can now be brazed to the bottom of the cylinder 14 or basket body portion to complete the outer stiff basket.

In this embodiment of the invention, the fine stainless steel wire mesh liner 19 has a double thickness side wall formed by folding a single wire mesh section upon itself, this folding line 20 being at the top of the liner 19 when the same is formed into a cylinder. The longitudinal meeting edges 21 of the cylindrical liner 19 thus formed after the folding operation are sewn together by a stainless steel thread 22. The same continuous thread 22 is then employed to join a double thickness fine mesh circular bottom wall 23 to the cylindrical liner 19 to complete the liner which remains open at its top.

An arcuate heat resistant shield 24 similar to the shield 12 is sandwiched between the two walls of the cylindrical liner 19 before the bottom wall 23 is applied thereto. The completed liner 19 can then be telescoped into the outer stiff wire basket and the top longitudinal wire extensions 18 are bent inwardly and downwardly around the folded top edge 20 of the liner to anchor it to the outer basket. The radial stiff wire extensions 17 are forced through the side wall of the liner 19 and bent over on the inner face of the liner to further anchor the same within the outer stiff wire basket.

A side carrying handle 25 for the device is secured to the exterior of the outer basket by bolts or rivets 26 which pass through the outer basket, the liner 19 and an interior rigid backing plate 27 which is also apertured at 28 to receive the fastener means 26. Thus, the side wall of the assembled basket is clamped between the handle flanges 29 and the interior backing plate 27.

FIG. 6 shows a variant of the invention according to the second embodiment. According to this variant, a backing plate 30 is placed inwardly of the outer basket or cylinder 31 and the carrying handle 32 is arranged exteriorly of the outer basket, the side wall of which is clamped or sandwiched between the elements 30 and 32. With this arrangement, the interior liner 19 and heat resistant shield 24 is free of direct attachment to the handle, as should be clear from the description and drawings.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A device to facilitate igniting and handling fuel briquettes comprising an outer stiff wire mesh basket body serving as a primary support for briquettes, an interior finer wire mesh liner for the outer basket body adapted to retain small briquette particles within the device during use thereof, said interior wire mesh being of a double thickness, said liner being telescoped into said basket body in the assembled device, a carrying handle for the device on the side wall thereof, and a heat shield panel on the side wall of the device adjacent to the handle to protect the hand of a user of the device, said heat shield panel being positioned within the outer wire mesh and a thickness of the interior wire mesh, said outer basket body and said liner being substantially cylindrical and open at their tops and having superposed bottom walls.

2. A device to facilitate igniting and handling fuel briquettes as defined in claim 1, and multiple short wire extensions on the upper end of said stiff wire mesh basket body and being folded over and around the top edge portion of said liner to secure the liner in fixed relation to said wire mesh basket body.

3. A device to facilitate igniting and handling fuel briquettes comprising an outer stiff wire mesh basket body serving as a primary support for briquettes, an interior finer wire mesh liner for the outer basket body adapted to retain small briquette particles within the device during use thereof, said liner being telescoped into said basket body in the assembled device, a carrying handle for the device on the side wall thereof, and a heat shield panel on the side wall of the device adjacent to the handle to protect the hand of a user of the device, said outer basket body and said liner being substantially cylindrical and open at their tops and having superposed bottom walls, said liner having a double thickness side wall, and said heat shield panel being sandwiched between the two sections of said double thickness liner side wall.

4. A device to facilitate igniting and handling fuel briquettes as defined in claim 3, and said handle arranged on the exterior of the outer stiff wire mesh basket body, a handle backing plate arranged on the interior of said liner side wall adjacent to the heat shield panel, and fastener elements interconnecting the handle and handle backing plate with the heat shield panel and double thickness liner side wall sandwiched therebetween.

5. A device to facilitate igniting and handling fuel briquettes as defined in claim 3, and said double thickness liner side wall consisting of a unitary folded section of fine wire mesh having ends thereof joined by a fine wire thread to produce a substantially cylindrical liner, and said liner having a double thickness bottom wall joined by said thread to the bottom of the cylindrical liner.

6. A device to facilitate igniting and handling fuel briquettes as defined in claim 3, and said stiff wire mesh basket body having multiple short wire extensions on its upper end in spaced relation around the circumference of the device and also having multiple short wire radial extensions on its side wall projecting inwardly, said wire extensions on said upper end being folded over the upper edge of said liner to anchor the liner and said short wire radial extensions penetrating through the side wall of said liner and being folded against the interior of the liner side wall to further anchor the liner in fixed relation to said outer stiff wire mesh basket body in the assembled device.

* * * * *